United States Patent
Ooki et al.

(10) Patent No.: US 12,181,712 B2
(45) Date of Patent: Dec. 31, 2024

(54) FUSION SPLICING DEVICE AND METHOD FOR OPERATING FUSION SPLICING DEVICE WITH ELECTRODE DISCHARGE TEST, EVALUATION, AND ADJUSTMENT

(71) Applicant: SUMITOMO ELECTRIC OPTIFRONTIER CO., LTD., Yokohama (JP)

(72) Inventors: Kazuyoshi Ooki, Yokohama (JP); Makoto Miyamori, Yokohama (JP); Hideaki Yusa, Yokohama (JP)

(73) Assignee: SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 537 days.

(21) Appl. No.: 17/631,787

(22) PCT Filed: Aug. 19, 2020

(86) PCT No.: PCT/JP2020/031320
§ 371 (c)(1),
(2) Date: Jan. 31, 2022

(87) PCT Pub. No.: WO2021/039546
PCT Pub. Date: Mar. 4, 2021

(65) Prior Publication Data
US 2022/0276440 A1    Sep. 1, 2022

(30) Foreign Application Priority Data
Aug. 29, 2019   (JP) ................................ 2019-156638

(51) Int. Cl.
*G02B 6/255*  (2006.01)
(52) U.S. Cl.
CPC ......... *G02B 6/2553* (2013.01); *G02B 6/2551* (2013.01)

(58) Field of Classification Search
CPC ..... G02B 6/2551; G02B 6/255; G02B 6/2553
See application file for complete search history.

(56) References Cited

U.S. PATENT DOCUMENTS

| 5,611,015 A | * | 3/1997 | Tokumaru | ............ | G02B 6/2555 |
| | | | | | 385/98 |
| 6,062,743 A | * | 5/2000 | Zheng | ................. | G02B 6/2551 |
| | | | | | 385/100 |

(Continued)

FOREIGN PATENT DOCUMENTS

| JP | H04-199107 A | 7/1992 |
| JP | H09-127337 A | 5/1997 |

(Continued)

OTHER PUBLICATIONS

Nov. 10, 2020 International Search Report issued in International Application No. PCT/JP2020/031320.

*Primary Examiner* — Andrew Jordan
(74) *Attorney, Agent, or Firm* — Oliff PLC

(57) ABSTRACT

A fusion splicing device includes a fusion splicing unit, a fusion splicing control unit, an imaging unit, and a notification unit. The fusion splicing unit fusion-splices optical fibers by discharge between a pair of electrode rods. The fusion splicing control unit controls an operation of the fusion splicing unit and has an operation mode for performing a discharge test. The imaging unit generates image data of a fusion spliced portion of the optical fibers. The notification unit notifies various kinds of information. The discharge test is to fusion-splice the optical fibers, to check a fusion-spliced state of the optical fibers on the basis of the image data, and to adjust a fusion splicing condition to be close to an optimum condition. When a predetermined start condition is satisfied, the fusion splicing control unit causes (Continued)

the notification unit to notify information for requesting execution of the discharge test.

14 Claims, 9 Drawing Sheets

(56) References Cited

U.S. PATENT DOCUMENTS

| | | | | | |
|---|---|---|---|---|---|
| 6,294,760 | B1* | 9/2001 | Inoue | ............. | G02B 6/2551 |
| | | | | | 219/383 |
| 6,702,481 | B2* | 3/2004 | Oki | ............. | G02B 6/2551 |
| | | | | | 385/11 |
| 6,921,216 | B1* | 7/2005 | Li | ............. | G02B 6/2551 |
| | | | | | 219/121.13 |
| 6,991,383 | B2* | 1/2006 | Huang | ............. | G02B 6/2551 |
| | | | | | 374/E11.006 |
| 9,063,285 | B2* | 6/2015 | Zheng | ............. | G02B 6/2551 |
| 9,513,439 | B2* | 12/2016 | Sasaki | ............. | G02B 6/2553 |
| 9,720,185 | B2* | 8/2017 | Halls | ............. | G02B 6/2558 |
| 9,964,705 | B2* | 5/2018 | Miyamori | ............. | G02B 6/2551 |
| 10,557,991 | B2* | 2/2020 | Zhao | ............. | G02B 6/2557 |
| 10,825,309 | B2* | 11/2020 | Ooki | ............. | G08B 21/0247 |
| 10,989,875 | B2* | 4/2021 | Ooki | ............. | G08B 13/1427 |
| 11,181,692 | B2* | 11/2021 | Meo | ............. | G02B 6/255 |
| 11,257,335 | B2* | 2/2022 | Ooki | ............. | G02B 6/2553 |
| 11,288,938 | B2* | 3/2022 | Ooki | ............. | G02B 6/2551 |
| 11,454,761 | B2* | 9/2022 | Suzuki | ............. | H04L 67/12 |
| 2002/0157424 | A1* | 10/2002 | Kasuu | ............. | G02B 6/2551 |
| | | | | | 65/407 |
| 2002/0159724 | A1* | 10/2002 | Oki | ............. | G02B 6/2551 |
| | | | | | 385/11 |
| 2002/0176673 | A1* | 11/2002 | Kasuu | ............. | G02B 6/2551 |
| | | | | | 219/121.45 |
| 2002/0197027 | A1* | 12/2002 | Saito | ............. | G02B 6/2551 |
| | | | | | 385/96 |
| 2003/0002827 | A1* | 1/2003 | Ozawa | ............. | G02B 6/2551 |
| | | | | | 385/96 |
| 2003/0108307 | A1* | 6/2003 | Eskildsen | ............. | G02B 6/266 |
| | | | | | 385/140 |
| 2005/0063664 | A1 | 3/2005 | Huang | | |
| 2005/0117856 | A1* | 6/2005 | Huang | ............. | G02B 6/2551 |
| | | | | | 385/96 |
| 2013/0284377 | A1 | 10/2013 | Takayanagi et al. | | |
| 2016/0116675 | A1* | 4/2016 | Sasaki | ............. | G02B 6/2553 |
| | | | | | 65/485 |
| 2022/0276440 | A1* | 9/2022 | Ooki | ............. | G02B 6/2553 |

FOREIGN PATENT DOCUMENTS

| | | |
|---|---|---|
| JP | 2004-317599 A | 11/2004 |
| JP | 2008-96833 A | 4/2008 |
| JP | 2012-141357 A | 7/2012 |
| WO | 03/096088 A1 | 11/2003 |

\* cited by examiner

FUSION SPLICING DEVICE AND METHOD FOR OPERATING FUSION SPLICING DEVICE WITH ELECTRODE DISCHARGE TEST, EVALUATION, AND ADJUSTMENT

TECHNICAL FIELD

The present disclosure relates to a fusion splicing device and an operation method of a fusion splicing device. This application claims priority based on Japanese Patent Application No. 2019-156638 filed on Aug. 29, 2019, and the entire contents of the Japanese patent application are incorporated herein by reference.

BACKGROUND ART

Patent Literature 1 describes a technology related to a fusion splicing device for fusion-splicing an optical fiber by discharge.

CITATION LIST

Patent Literature

[Patent Literature 1] Japanese Unexamined Patent Application Publication No. 2012-141357

SUMMARY OF INVENTION

A fusion splicing device according to the present disclosure includes a fusion splicing unit, a fusion splicing control unit, an imaging unit, and a notification unit. The fusion splicing unit is configured to fusion-splice optical fibers by discharge between a pair of electrode rods. The fusion splicing control unit is configured to control an operation of the fusion splicing unit and has an operation mode for performing a discharge test. The imaging unit is configured to generate image data of a fusion spliced portion of the optical fibers. The notification unit is configured to notify various kinds of information. The discharge test is to fusion-splice the optical fibers, to check a fusion-spliced state of the optical fibers on the basis of the image data, and to adjust a fusion splicing condition to be close to an optimum condition. When a predetermined start condition is satisfied, the fusion splicing control unit causes the notification unit to notify information for requesting execution of the discharge test.

An operation method of a fusion splicing device according to the present disclosure is an operation method of a device that fusion-splices optical fibers by discharge between a pair of electrode rods. The operation method includes a step of causing a notification unit that notifies various types of information to notify information for requesting execution of a discharge test when a predetermined start condition is satisfied. In the discharge test, the optical fibers are fusion-spliced, a fusion spliced state of the optical fibers is checked on the basis of image data of a fusion spliced portion of the optical fibers, and a fusion splicing condition is adjusted to be close to an optimum condition.

DESCRIPTION OF EMBODIMENTS

Figure 1:
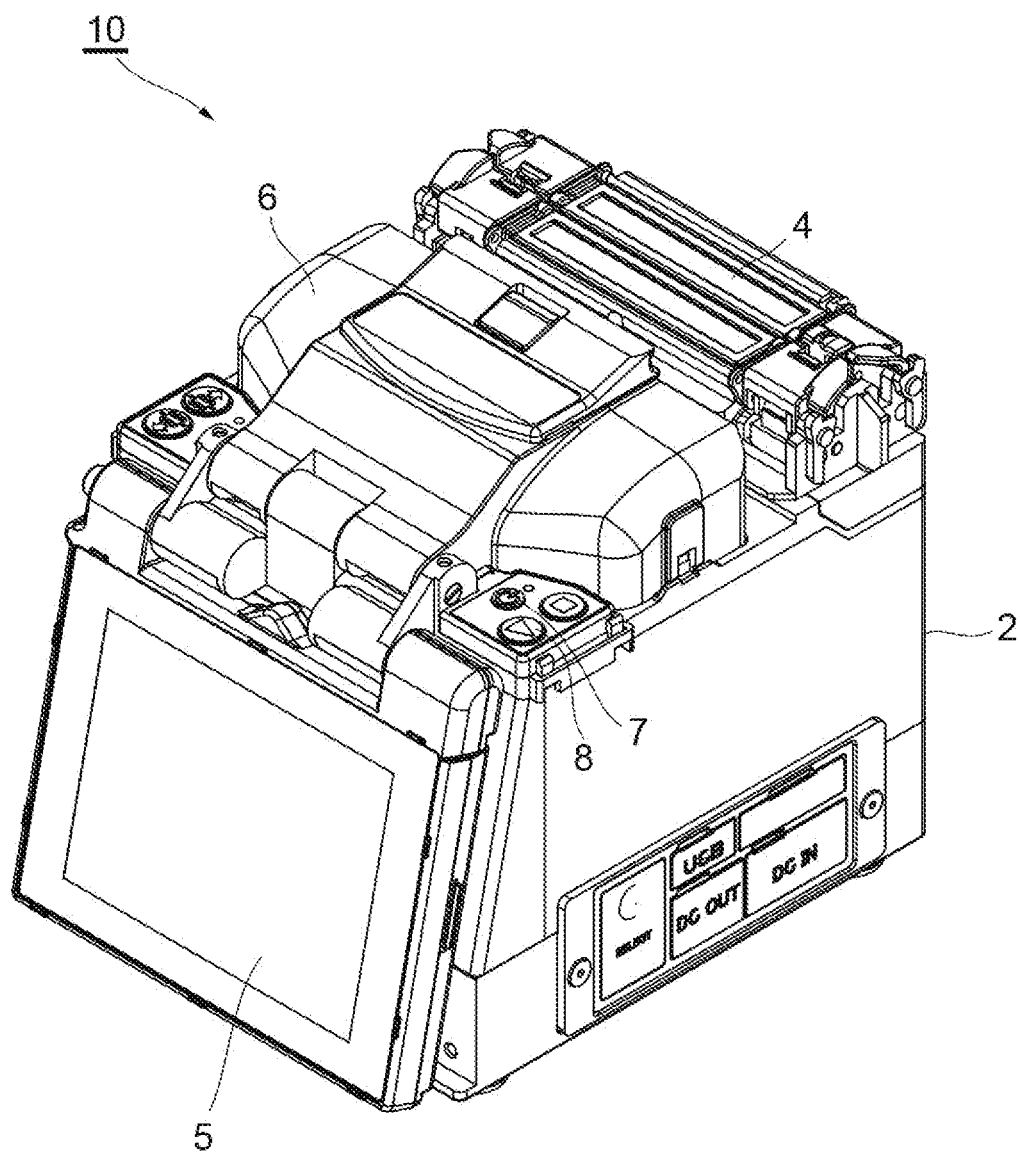
FIG. 1 is a perspective view illustrating an appearance of a fusion splicing device and shows an appearance in a state where a protection cover is closed.

Problems to be Solved by Present Disclosure

When optical fibers are fusion-spliced, a fusion splicing condition such as a discharge power and positions of tip ends of the optical fibers is determined. Depending on the fusion splicing condition, a quality of the fusion splicing varies, and a transmission loss in the fusion spliced portion is influenced. Since an optimum fusion splicing condition change depending on a use situation of a fusion splicing device, it is desirable to adjust a fusion splicing condition at an appropriate timing in a fusion splicing operation of optical fibers. Therefore, a recent fusion splicing device has an operation mode for performing a discharge test. The discharge test is to fusion-splice optical fibers, to capture an image of a fusion spliced portion to obtain image data, to check a fusion-spliced state of the optical fibers by analyzing the image data, and to adjust a fusion splicing condition to be close to an optimum condition. In the operation mode of the discharge test, the series of operations are performed automatically. However, in a conventional fusion splicing device, the timing of performing the discharge test is determined by a user, and thus it is difficult to perform the discharge test at an appropriate timing.

Advantageous Effects of Present Disclosure

According to the present disclosure, it is possible to provide a fusion splicing device and an operation method of a fusion splicing device that can perform a discharge test at an appropriate timing.

Description of Embodiments of Present Disclosure

First, embodiments of the present disclosure will be listed and described. A fusion splicing device according to an embodiment includes a fusion splicing unit, a fusion splicing control unit, an imaging unit, and a notification unit. The fusion splicing unit fusion-splices optical fibers by discharge between a pair of electrode rods. The fusion splicing control unit controls an operation of the fusion splicing unit and has an operation mode for performing a discharge test. The imaging unit generates image data of a fusion spliced portion of the optical fibers. The notification unit notifies various kinds of information. The discharge test is to fusion-splice the optical fibers, to check a fusion-spliced state of the optical fibers on the basis of the image data, and to adjust a fusion splicing condition to be close to an optimum condition. When a predetermined start condition is satisfied, the fusion splicing control unit causes the notification unit to notify information for requesting execution of the discharge test.

In this fusion splicing device, when a predetermined start condition is satisfied, the fusion splicing control unit causes the notification unit to notify the information for requesting execution of the discharge test. As a result, it is possible to reliably notify a user of an appropriate timing at which the discharge test is performed, and thus it is possible to perform the discharge test at an appropriate timing.

The start condition may be first starting of the fusion splicing control unit after shipment of the fusion splicing device. When the fusion splicing device is used for the first time after shipment, an optimum fusion splicing condition may be significantly different from that before shipment. Therefore, when the fusion splicing control unit is started up for the first time after the fusion splicing device is shipped, it is desirable to perform a discharge test to adjust a fusion splicing condition. Accordingly, it is possible to suppress a decrease in splicing quality in an initial fusion splicing operation.

The start condition may be completion of replacement of at least one of the electrode rods. An optimum fusion splicing condition changes greatly between before and after the replacement of at least one of the electrode rods. Therefore, after replacing at least one of the electrode rods, it is desirable to perform a discharge test to adjust a fusion splicing condition before performing a usual fusion splicing operation. Accordingly, it is possible to suppress a decrease in splicing quality caused by the replacement of at least one of the electrode rods.

The start condition may be completion of a running-in discharge after replacement of at least one of the electrode rods. After at least one of the electrode rods is replaced, the running-in discharge may be performed in order to stabilize discharge. In such a case, an optimum fusion splicing condition greatly changes between before the running-in discharge and after the running-in discharge. Therefore, after the running-in discharge, it is desirable to perform a discharge test to adjust a fusion splicing condition before performing a usual fusion splicing operation. Accordingly, it is possible to suppress a decrease in splicing quality caused by the running-in discharge.

The start condition may be that a shape of at least one of the electrode rods becomes a predetermined shape. Alternatively, the start condition may be that a shape of at least one of the electrode rods is deformed to a predetermined degree from a last-time discharge test. The electrode rods wear out with each repeated discharge, and the shapes of the electrode rods gradually change. As the shapes of the electrode rods change, an optimum fusion splicing condition gradually changes. However, if a discharge test is performed for each discharge, a frequency of the discharge test increases, and an efficiency of the fusion splicing operation decreases. Therefore, when the shape of at least one of the electrode rods becomes a specific shape or when the shape of at least one of the electrode rods is deformed to a predetermined degree from a last-time discharge test, it is desirable to adjust a fusion splicing condition by performing the discharge test. Accordingly, it is possible to suppress a decrease in splicing quality caused by a change in the shapes of the electrode rods while suppressing a decrease in work efficiency.

The start condition may be that a change amount of either one or both of an air temperature and an air pressure exceeds a predetermined threshold condition from a last-time discharge test. When a location where a fusion splicing device is used changes, weather conditions such as an air temperature and an air pressure also change. As the weather conditions change, an optimum fusion splicing condition also changes. Therefore, it is desirable to adjust a fusion splicing condition by performing a discharge test when the change amount of either one or both of the air temperature and the air pressure from the last-time discharge test exceeds a predetermined threshold condition. As a result, a decrease in splicing quality due to a change in weather conditions can be suppressed.

The start condition may be that an estimated loss value exceeds a predetermined threshold condition. A larger estimated loss value means that a fusion splicing condition deviates from an optimum condition. Therefore, it is desirable to perform a discharge test to adjust the fusion splicing condition when the estimated loss value exceeds a predetermined threshold condition. As a result, a decrease in splicing quality can be suppressed.

The start condition may be occurrence of defective fusion splicing of the optical fibers. An occurrence of the defective fusion splicing means that a fusion splicing condition deviates from an optimum condition. Therefore, it is desirable to adjust the fusion splicing condition by performing a discharge test when the defective fusion splicing occurs. As a result, it is possible to suppress continuous occurrences of defective fusion splicing.

The fusion splicing control unit may keep causing the notification unit to notify the information for requesting execution of the discharge test until the execution of the discharge test is started. As a result, a user can be strongly prompted to execute the discharge test.

The fusion splicing control unit may refuse a usual fusion splicing operation until the discharge test is completed. As a result, a user can be forced to execute the discharge test, so that it is possible to avoid a decrease in splicing quality due to non-execution of the discharge test.

The notification unit may include a monitor or may include a speaker. For example, in this case, it is possible to reliably notify a user of an appropriate timing at which the discharge test is performed.

An operation method of a fusion splicing device according to an embodiment is an operation method of a device that fusion-splices optical fibers by discharge between a pair of electrode rods. The operation method includes a step of causing a notification unit that notifies various types of information to notify information for requesting execution of a discharge test when a predetermined start condition is satisfied. In the discharge test, the optical fibers are fusion-spliced, a fusion spliced state of the optical fibers is checked on the basis of image data of a fusion spliced portion of the optical fibers, and a fusion splicing condition is adjusted to be close to an optimum condition.

In this operation method, when a predetermined start condition is satisfied, the notification unit notifies a request to execute a discharge test. As a result, it is possible to reliably notify a user of an appropriate timing at which the discharge test is performed, and thus it is possible to perform the discharge test at an appropriate timing.

Details of Embodiments of Present Disclosure

Specific examples of a fusion splicing device and an operation method of a fusion splicing device according to the present disclosure will be described below with reference to the drawings. The present invention is not limited to the following examples, and is defined by Claims, and is intended to embrace all the modifications within the meaning and scope equivalent to the Claims. In the following description, the same elements are denoted by the same reference numerals in the description of the drawings, and redundant descriptions thereof will be omitted.

Figure 2:
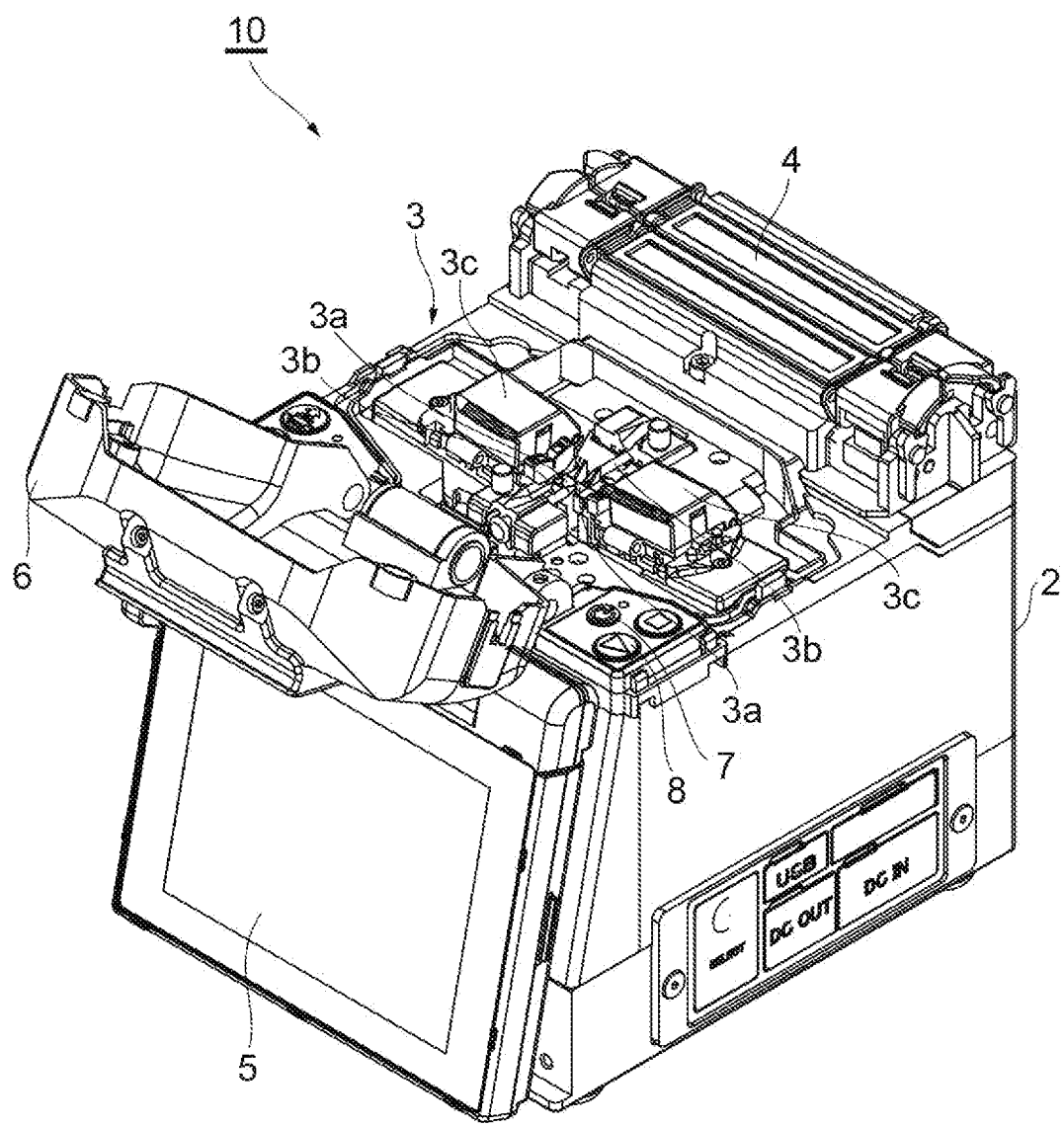
FIG. 2 is a perspective view illustrating an appearance of a fusion splicing device and shows an appearance in a state where a protection cover is opened to reveal an internal structure of the fusion splicing device.

FIGS. 1 and 2 are perspective views illustrating an appearance of a fusion splicing device 10 according to the present embodiment. FIG. 1 illustrates an appearance in a state where a protection cover is closed. FIG. 2 illustrates an appearance in a state where the protection cover is opened to reveal an internal structure of fusion splicing device 10. Fusion splicing device 10 is a device for fusion-splicing optical fibers by discharge. As illustrated in FIGS. 1 and 2, fusion splicing device 10 includes a box-shaped housing 2. A fusion splicing unit 3 for fusion-splicing optical fibers and a heater 4 are provided on the upper part of housing 2. Heater 4 heats and contracts a fiber reinforcement sleeve to be put on a fusion spliced portion of optical fibers. Fusion splicing device 10 further includes a monitor 5, a protection cover 6, a power switch 7, and a splicing start switch 8. Monitor 5 is a notification unit in the present embodiment, and notifies by displaying various kinds of information. The various kinds of information include, for example, a fusion splicing state of optical fibers whose image is captured by a camera disposed inside housing 2. Protection cover 6 prevents wind from entering fusion splicing unit 3. Power switch 7 is a push button for switching ON/OFF of the power of fusion splicing device 10 in response to an operation of a user. Splicing start switch 8 is a push button for starting a fusion splicing operation of optical fibers in response to an operation of a user.

As illustrated in FIG. 2, fusion splicing unit 3 includes a pair of fiber positioning units 3a, a pair of electrode rods 3b, and a holder placement unit on which a pair of optical fiber holders 3c can be placed. Each optical fiber to be fusion-spliced is held and fixed in a corresponding optical fiber holder of the pair of optical fiber holders 3c. Each of optical fiber holders 3c is placed and fixed on the holder placement unit. Fiber positioning units 3a are disposed between optical fiber holders 3c. Fiber positioning units 3a position the tip ends of the optical fibers held by respective optical fiber holders 3c. Electrode rods 3b are disposed between fiber positioning units 3a. Electrode rods 3b fusion-splice the tip ends of the optical fibers by arc discharge.

Figure 3:
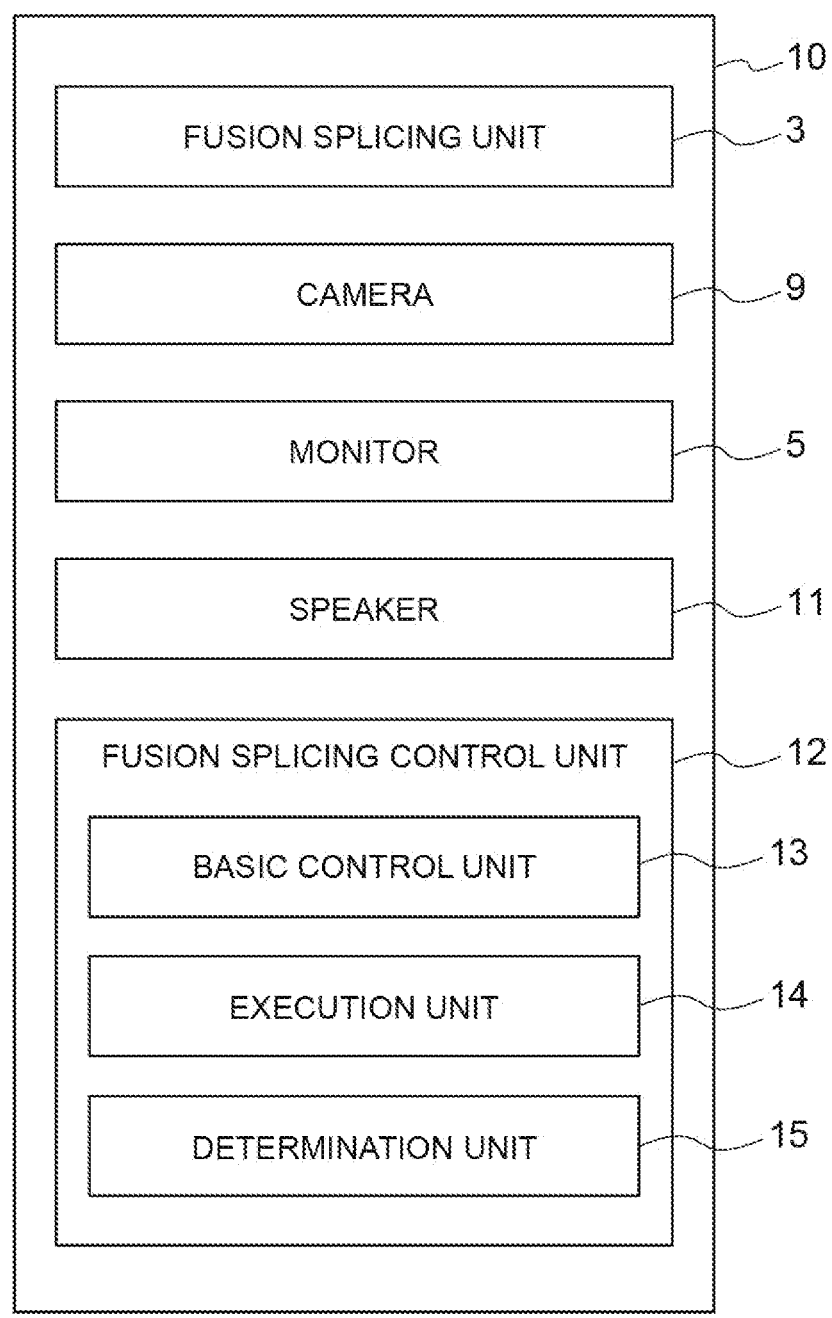
FIG. 3 is a functional block diagram illustrating a configuration of an internal system included in a fusion splicing device.

FIG. 3 is a functional block diagram illustrating a configuration of an internal system included in fusion splicing device 10. As illustrated in FIG. 3, fusion splicing device 10 includes a fusion splicing control unit 12, a camera 9, a monitor 5, and a speaker 11 in addition to fusion splicing unit 3 described above. Camera 9 is an imaging unit in the present embodiment. Camera 9 is disposed inside housing 2 and captures an image of a fusion spliced portion of optical fibers to generate image data of the portion.

Figure 4:
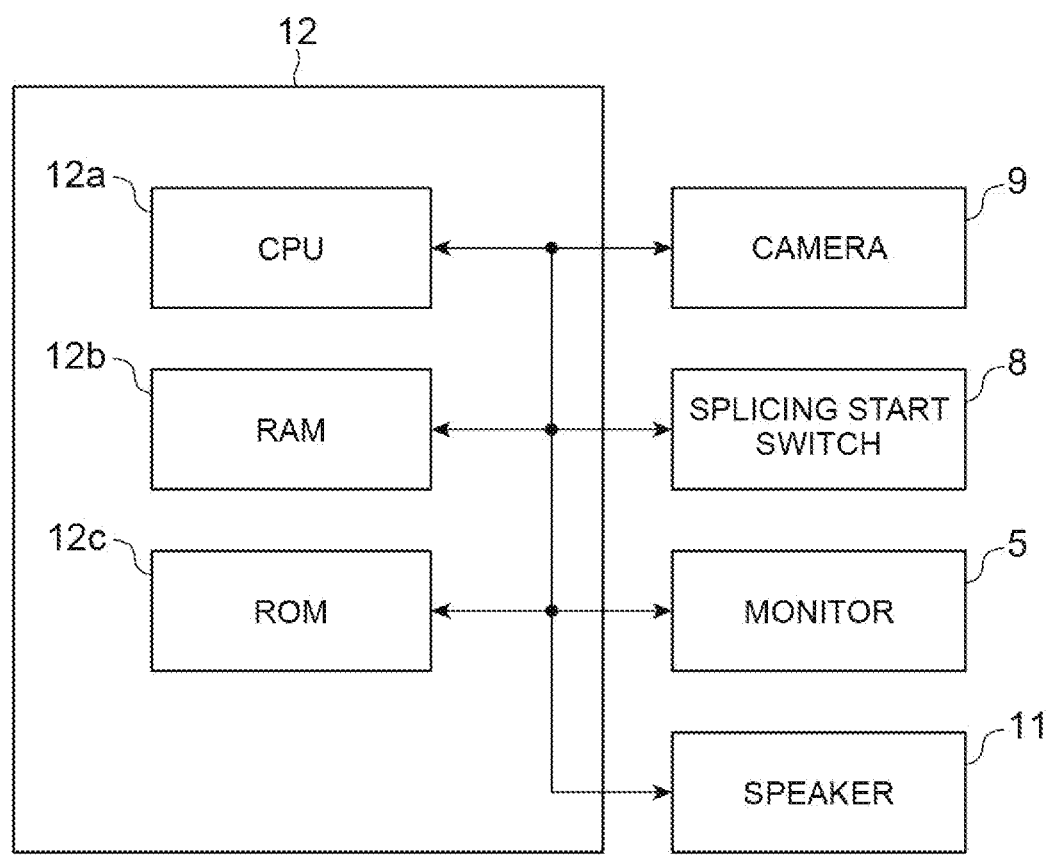
FIG. 4 is a block diagram illustrating an example of a hardware configuration of a fusion splicing control unit.

FIG. 4 is a block diagram illustrating an example of a hardware configuration of fusion splicing control unit 12. As illustrated in FIG. 4, fusion splicing control unit 12 may be configured as a computer including a CPU 12a, a RAM 12b, and a ROM 12c. Fusion splicing control unit 12 reads and writes data from and to RANI 12b and ROM 12c under the control of CPU 12a while reading and executing a program pre-stored in ROM 12c. Accordingly, fusion splicing control unit 12 can realize each function of fusion splicing control unit 12. The operation status of fusion splicing control unit 12 is always displayed on monitor 5 during an operation of fusion splicing device 10. Fusion splicing control unit 12 is electrically connected to splicing start switch 8 and receives an electrical signal from splicing start switch 8.

As illustrated in FIG. 3, fusion splicing control unit 12 includes a basic control unit 13, an execution unit 14, and a determination unit 15. Basic control unit 13 controls an operation of fusion splicing unit 3. In other words, basic control unit 13 controls an abutting operation of the tip ends of optical fibers and arc discharge in fusion splicing unit 3 in response to an operation of splicing start switch 8 by a user. The abutting operation of the tip ends of the optical fibers includes a processing of positioning the optical fibers by fiber positioning units 3a, that is, control of the tip end position of each optical fiber. The control of arc discharge includes a control of a discharge power and a control of a discharge timing. Various fusion splicing conditions such as the tip end positions of optical fibers and the discharge power are stored in ROM 12c of fusion splicing control unit 12.

Figure 5:
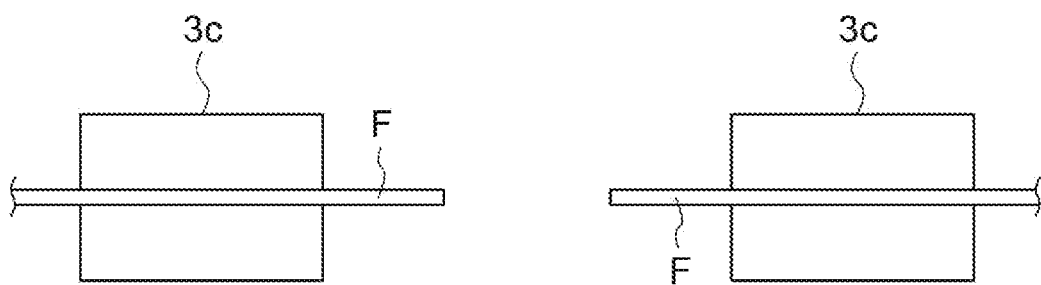
FIG. 5 is a diagram illustrating a part of a series of steps in a discharge test.
Figure 6:
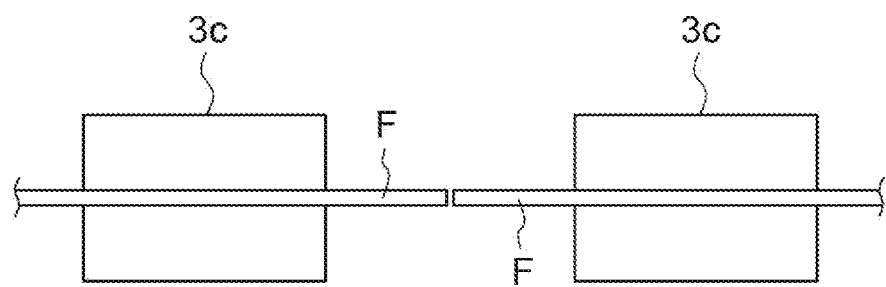
FIG. 6 is a diagram illustrating a part of a series of steps in a discharge test.
Figure 7:
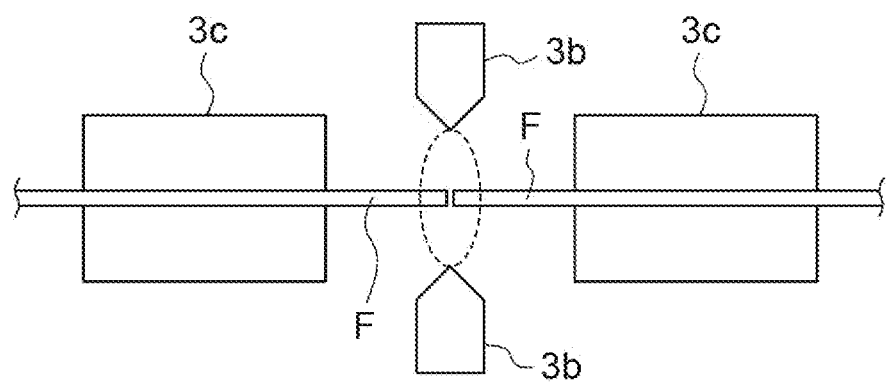
FIG. 7 is a diagram illustrating a part of a series of steps in a discharge test.
Figure 8:
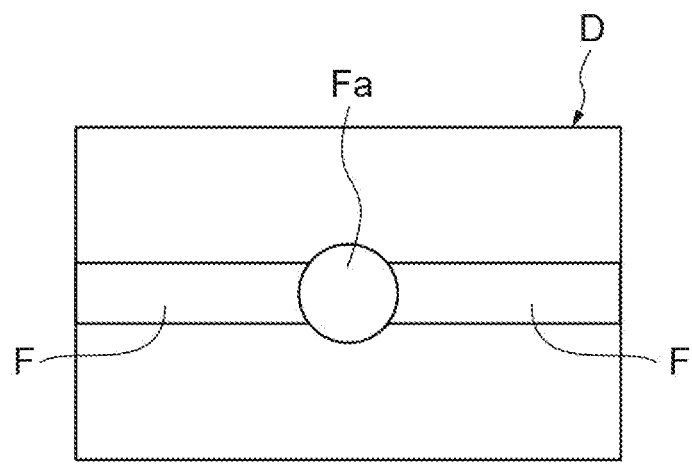
FIG. 8 is a diagram illustrating a part of a series of steps in a discharge test.

Execution unit 14 executes a discharge test mode of fusion splicing control unit 12 by issuing instructions to basic control unit 13 and camera 9. The discharge test is a general term for the following series of steps (1) to (6). (1) As illustrated in FIG. 5, a user sets optical fibers F used for a discharge test to the respective optical fiber holders 3c. (2) The user instructs fusion splicing device 10 to start a discharge test. This instruction is performed through an input means such as a switch provided in fusion splicing device 10. When monitor 5 is a touch panel, a button for instructing a start of the discharge test may be displayed on a part of monitor 5. (3) As illustrated in FIG. 6, basic control unit 13 positions each of optical fibers F based on each tip end position of optical fibers F stored in advance. (4) As illustrated in FIG. 7, basic control unit 13 causes the pair of electrode rods 3b to generate arc discharge therebetween to fusion-splice optical fibers F. A discharge power, a discharge time, and the number of discharges at this time are all the same as those of usual fusion splicing. (5) As illustrated in FIG. 8, camera 9 captures an image of a fusion spliced portion Fa to generate image data D. (6) Execution unit 14 confirms a splicing state of fusion spliced portion Fa on the basis of image data D. Execution unit 14 automatically adjusts a fusion splicing condition such as a tip end position of the optical fiber and a discharge power to be close to an optimum fusion condition, and resets the fusion splicing condition. The reset fusion splicing condition is stored in ROM 12c of fusion splicing control unit 12.

The above steps (1) to (6) are repeated until an estimated loss value based on a splicing state is less than or equal to a predetermined threshold. Steps (3) to (6) are automatically performed by fusion splicing device 10 without an operation of a user.

When a predetermined start condition is satisfied, determination unit 15 cause a notification unit to notify information for requesting execution of a discharge test. In the present disclosure, the term "notification unit" includes not only those that display information that can be recognized visually, such as monitor 5, but also those that notify information that can be recognized audibly, such as speaker 11. Through the information for requesting execution of the discharge test, a user is prompted to execute the discharge test. A screen for prompting the execution of the discharge test may be displayed on the entire surface of monitor 5 or may be displayed on only a part of monitor 5. Alternatively, a warning sound or the like for requesting the execution of the discharge test may be emitted from speaker 11. Until the discharge test is executed, determination unit 15 keeps causing monitor 5 to display a screen for prompting the execution of the discharge test or keeps causing speaker 11 to emit a warning sound. While the above-described screen is displayed on monitor 5 or while the warning sound is emitted from speaker 11, basic control unit 13 may accept a usual fusion splicing operation. Alternatively, basic control unit 13 may refuse a usual fusion splicing operation until the discharge test is completed.

For example, in any of the following cases, determination unit 15 causes the notification unit (either one or both of monitor 5 and speaker 11) to notify information for requesting execution of a discharge test, and prompts a user to execute the discharge test.

(A) When fusion splicing control unit 12 is first started after shipment of fusion splicing device 10.

In this case, a predetermined start condition is first starting of fusion splicing control unit 12 after shipment of fusion splicing device 10. In many cases, a program of fusion splicing control unit 12 is provided with a flag that becomes a significant value only at the first starting. When this flag is set to a significant value at the starting of fusion splicing control unit 12, fusion splicing control unit 12 recognizes that this is the first starting after shipment, and performs initial settings such as license authentication. In fusion splicing control unit 12 of the present embodiment, determination unit 15 refers to the flag separately from such initial settings. When determination unit 15 recognizes that this is the first starting after shipment, determination unit 15 causes monitor 5 to display information for requesting execution of a discharge test, causes speaker 11 to emit a warning sound for requesting execution of the discharge test, and prompts a user to execute the discharge test through either one or both of monitor 5 and speaker 11.

(B) When at least one of electrode rods 3*b* is replaced.

In this case, a predetermined start condition is that at least one of electrode rods 3*b* is replaced. Electrode rods 3*b* wears out with each repeated discharge, and their tips are gradually retracted, so that it needs to be replaced periodically. The fact that at least one of electrode rods 3*b* has been replaced can be recognized, for example, by disposing a detection unit for detecting an attachment/detachment of electrode rod 3*b* inside housing 2. For example, the detection unit may have a system of detecting the presence or absence of electrode rods 3*b* by a change in magnetic force intensity. The detection unit may identify characters printed on electrode rods 3*b* for identifying individual electrode rods 3*b* on the basis of an image obtained from camera 9.

The detection unit may have a system of outputting radio waves to detect the presence or absence of electrode rods 3*b* by a change in radio wave intensity. When determination unit 15 recognizes that at least one of electrode rods 3*b* is replaced, determination unit 15 prompts a user to perform a discharge test through either one or both of monitor 5 and speaker 11.

(C) When a running-in discharge is completed.

In this case, a predetermined start condition is completion of a running-in discharge, that is, an idling discharge after at least one of electrode rods 3*b* is replaced. After at least one of electrode rods 3*b* is replaced, a discharge path may be changed due to individual differences in electrode rods 3*b*, discharge environment, and the like. The running-in discharge is performed to stabilize a discharge path from electrode rods 3*b* after at least one of electrode rods 3*b* is replaced. In one example, a discharge power of the running-in discharge is the same as a discharge power in a usual fusion splicing, and a discharge time of the running-in discharge is shorter than a discharge time in a usual fusion splicing. However, the number of discharges in the running-in discharge is much larger than the number of discharges in a usual fusion splicing, for example, 10 times or more as large as the number of discharges in a usual fusion splicing. For example, basic control unit 13 may have a running-in discharge mode and perform a running-in discharge in response to an instruction by a user. Since the running-in discharge is performed by fusion splicing control unit 12, determination unit 15 can easily recognize that the running-in discharge is completed. When determination unit 15 recognizes that the running-in discharge is completed, determination unit 15 prompts a user to perform a discharge test through either one or both of monitor 5 and speaker 11.

(D) When electrode rod 3*b* becomes a predetermined shape.

In this case, a predetermined start condition is that a shape of at least one of electrode rods 3*b* becomes a predetermined specific shape. Alternatively, a predetermined start condition is that at least one of electrode rods 3*b* is deformed to a predetermined degree with respect to a last-time discharge test. As described above, electrode rods 3*b* wear out with each repeated discharge, and the tips thereof are gradually retracted. At this time, roundnesses of the tip shape of electrode rods 3*b* gradually increase, and angles of the top portion of electrode rods 3*b* gradually increase. Such a change in shape can be observed on the basis of an image obtained by camera 9. Each time the discharge test is executed, determination unit 15 stores the outer shapes of electrode rods 3*b* or a predetermined feature value analyzed from the outer shapes in, for example, ROM 12*c*. Determination unit 15 analyzes the shapes of electrode rods 3*b* on the basis of the images of camera 9 each time a usual fusion splicing process is performed or each time fusion splicing device 10 is started up. Then, determination unit 15 determines whether or not the shape has become a specific shape, or whether or not the shape is deformed to a predetermined degree from the last-time discharge test. This determination is made based on various feature values such as distances from reference positions to the tips of electrode rods 3*b*, projected areas of electrode rods 3*b* in images, and angles of the tips of electrode rods 3*b*. Determination unit 15 prompts a user to execute a discharge test through either one or both of monitor 5 and speaker 11 when at least one of these feature values becomes a predetermined value or changes by a predetermined ratio or more.

(E) When a change amount of either one or both of an air temperature and an air pressure exceeds a predetermined threshold condition.

In this case, a predetermined start condition is that a change amount of either one or both of an air temperature and an air pressure from a last-time discharge test exceeds a predetermined threshold condition. In this case, each time a discharge test is performed, determination unit 15 stores data on either one or both of an air temperature and an air pressure in ROM 12*c*, for example. Determination unit 15 may obtain air temperature data from a thermometer included in fusion splicing device 10. Alternatively, determination unit 15 may obtain air temperature data from the outside of fusion splicing device 10, for example, a server that manages a plurality of fusion splicing devices 10, through a communication means. Similarly, determination unit 15 may obtain air pressure data from a pressure gauge included in fusion splicing device 10. Alternatively, determination unit 15 may obtain air pressure data from the outside of fusion splicing device 10, for example, a server that manages a plurality of fusion splicing devices 10, through a communication means. When an air temperature data and an air pressure data are obtained from the outside of fusion splicing device 10, the air temperature data and the air pressure data may be obtained from public weather information. Determination unit 15 obtains data on either one or both of an air temperature and an air pressure periodically or each time fusion splicing device 10 is started up. Determination unit 15 prompts a user to execute a discharge test through either one or both of monitor 5 and speaker 11 when a change amount of the data from the last-time discharge test exceeds a predetermined threshold condition. The predetermined threshold condition may be that an air temperature or an air pressure is greater than a certain threshold value, or that a formula including an air temperature or an air pressure falls outside a certain threshold range. The formula is, for example, a second degree formula, or a third or higher degree formula.

(F) When an estimated loss value exceeds a predetermined threshold condition.

In this case, a predetermined start condition is that an estimated loss value calculated by fusion splicing control unit 12 exceeds a predetermined threshold condition. Fusion splicing control unit 12 calculates an estimated loss value by analyzing an image of a fusion spliced portion captured by camera 9 immediately after a usual fusion splicing operation. This estimated loss value is stored, for example, in ROM 12c each time a usual fusion splicing operation is performed. Determination unit 15 prompts a user to execute a discharge test through monitor 5 and speaker 11 when the estimated loss value exceeds a predetermined threshold condition. Various conditions based on the estimated loss value can be considered as a predetermined threshold condition. A predetermined threshold condition is, for example, that an estimated loss value exceeds a predetermined threshold for multiple consecutive times, or that the following formula, {(moving average of estimated loss values this time)−(moving average of estimated loss values M times before)}/M, where M is an integer of 2 or more, is greater than a predetermined threshold value.

(G) When fusion splicing is failed.

In this case, a predetermined start condition is that a defective fusion splicing is found in a fusion spliced portion when the fusion spliced portion is observed after fusion splicing of optical fibers. Fusion splicing control unit 12 detects a defective fusion spliced portion by analyzing an image of the fusion spliced portion captured by camera 9 immediately after a usual fusion splicing operation. When a defective fusion splicing is detected in the fusion spliced portion, determination unit 15 prompts a user to perform a discharge test through either one or both of monitor 5 and speaker 11. The defective fusion splicing of the fusion spliced portion includes, for example, the following states.

Core Shift

This is a state in which an amount of deviation between optical axes of two optical fibers to be fusion-spliced exceeds an allowable value.

Fatting

This is a state where a ratio ($D_1/D_2$) of an outer radius $D_1$ of a fusion spliced portion to an outer radius $D_2$ of the optical fibers in a cross section perpendicular to optical axes of the optical fibers exceeds an upper limit value. The upper limit is greater than 1.

Thinning

This is a state where a ratio ($D_1/D_2$) of an outer radius $D_1$ of a fusion spliced portion to an outer radius $D_2$ of the optical fibers in a cross section perpendicular to the optical axes of the optical fibers is less than a lower limit value. The lower limit value is smaller than 1.

Bubble

This is a state where a bubble is generated inside a fusion spliced portion.

White Streak

This is a state where a white line appears on a boundary line between two optical fibers in an image.

Black Streak

This is a state where a black line appears on a boundary line between two optical fibers in an image.

Figure 9:
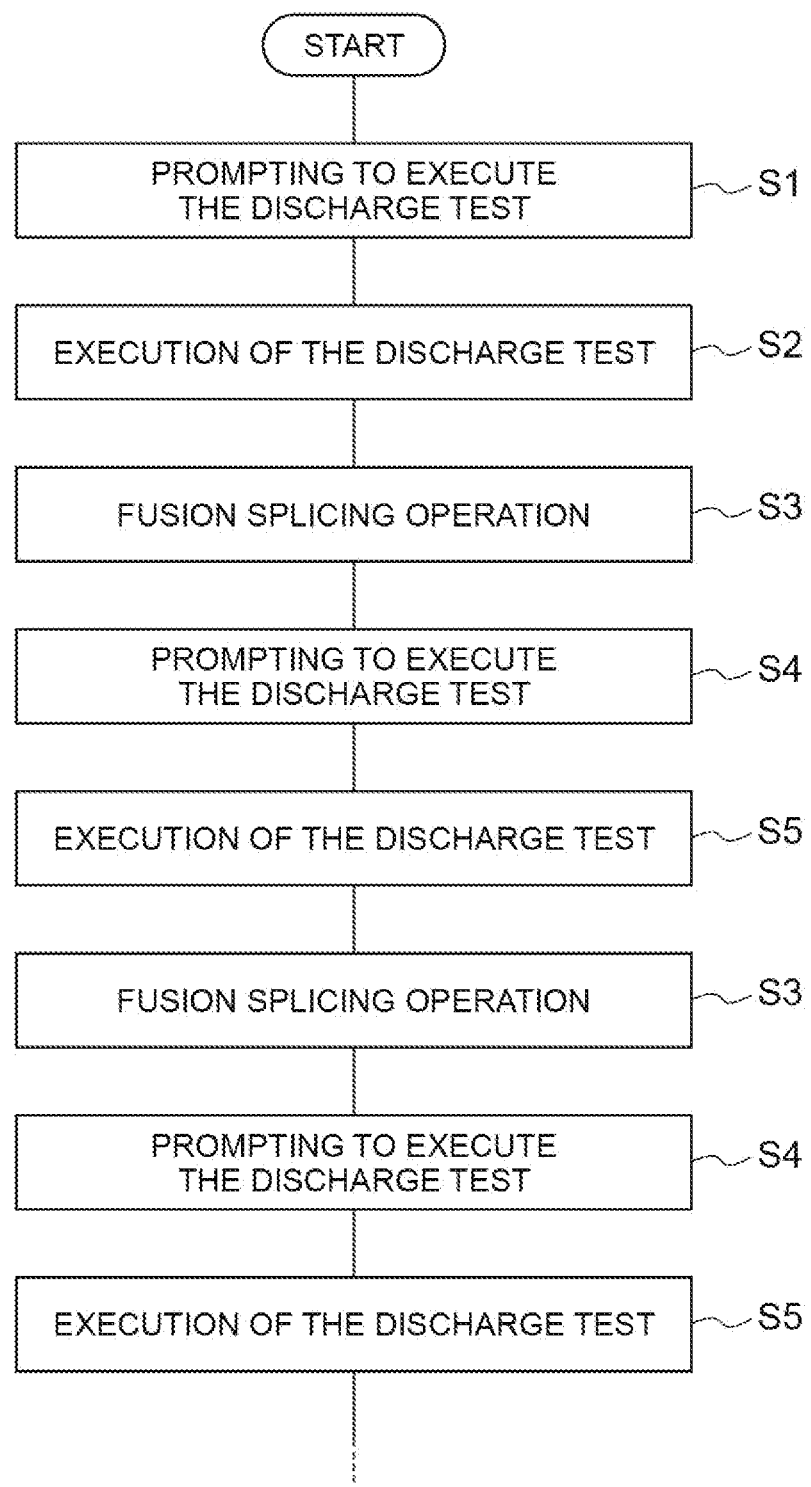
FIG. 9 is a flow chart illustrating an operation method of a fusion splicing device.

FIG. 9 is a flow chart illustrating an operation method of fusion splicing device 10 of the present embodiment. In this fusion splicing device 10, first, at the first operation after shipment, determination unit 15 causes the notification unit to notify information for requesting execution of a discharge test, and prompts a user to execute the discharge test through either one or both of monitor 5 and speaker 11 (the above-described start condition (A), step S1). The user instructs execution of the discharge test. Accordingly, execution unit 14 performs the discharge test and appropriately adjusts a fusion splicing condition (step S2).

Subsequently, the user repeatedly performs a fusion splicing operation of optical fibers using fusion splicing device 10 (step S3). Specifically, the user sets optical fibers to be fusion-spliced in optical fiber holders 3c and operates splicing start switch 8. Basic control unit 13 controls the tip positions of the optical fibers and a discharge condition, and performs arc discharge. Thus, the optical fibers are fusion-spliced to each other. This operation is repeated for each splicing portion of the optical fibers.

Here, before or after each fusion splicing operation, when determination unit 15 determines that any one of the above-described start conditions (B) to (G) is satisfied, determination unit 15 causes the notification unit to notify information for requesting execution of a discharge test and prompts the user to execute the discharge test through either one or both of monitor 5 or speaker 11 (notification unit) (step S4). The user instructs execution of the discharge test. Accordingly, execution unit 14 performs the discharge test and appropriately adjusts the fusion splicing condition (step S5). Thereafter, steps S3 to S5 are repeated.

Effects obtained by fusion splicing device 10 and the operation method thereof according to the present embodiment described above will be described. As described above, in the conventional fusion splicing device, the timing of performing a discharge test is determined by a user, and thus it is difficult to perform the discharge test at an appropriate timing. When a discharge test is not performed at an appropriate timing, a splicing loss increases, and an unnecessary work such as redoing the operation due to splicing failure occurs. Alternatively, when a discharge test is performed even though the discharge test is unnecessary, problems such as an increase in working time, wasteful consumption of a fusion splicing device, which is, for example, consumption of electrode rods 3b, a decrease in a charging amount of a battery, and the like may occur.

In order to solve these problems, in fusion splicing device 10 and the operation method thereof according to the present embodiment, when any one of the predetermined start conditions (A) to (G) is satisfied, fusion splicing control unit 12 causes the notification unit (either one or both of monitor 5 and speaker 11) to notify information for requesting execution of a discharge test, and prompts a user to execute the discharge test through either one or both of monitor 5 and speaker 11. As a result, it is possible to reliably notify the user of an appropriate timing at which the discharge test is performed, and thus it is possible to perform the discharge test at an appropriate timing. Therefore, it is possible to suppress an increase in splicing loss and an increase in the number of times of redoing a splicing work due to non-execution of the discharge test. Further, it is possible to suppress an increase in work time and the consumption of the fusion splicing device due to execution of an unnecessary discharge test.

As in the start condition (A) of the present embodiment, the start condition may be first starting of fusion splicing control unit 12 after shipment of fusion splicing device 10. When fusion splicing device 10 is used for the first time after shipment, an optimum fusion splicing condition may be significantly different from that at the time of manufacture. Therefore, after fusion splicing device 10 is shipped, when fusion splicing control unit 12 is started for the first time, it is desirable to perform a discharge test to adjust a fusion splicing condition. Accordingly, it is possible to suppress a decrease in splicing quality in an initial fusion splicing operation.

As in the start condition (B) of the present embodiment, the start condition may be completion of replacement of at least one of the electrode rods. An optimum fusion splicing condition changes greatly between before and after at least one of electrode rods 3b is replaced. Therefore, after replacing at least one of electrode rods 3b, it is desirable to adjust a fusion splicing condition by performing a discharge test before performing a usual fusion splicing operation. Accordingly, it is possible to suppress a decrease in splicing quality caused by replacement of at least one of electrode rods 3b.

As in the start condition (C) of the present embodiment, the start condition may be completion of a running-in discharge after replacement of at least one of the electrode rods. After at least one of electrode rods 3b is replaced, a running-in discharge may be performed to stabilize discharge. In such a case, an optimum fusion splicing condition greatly changes between before the running-in discharge and after the running-in discharge. Therefore, after the running-in discharge, it is desirable to perform a discharge test to adjust a fusion splicing condition before performing a usual fusion splicing operation. Accordingly, it is possible to suppress a decrease in splicing quality caused by the running-in discharge.

As in the start condition (D) of the present embodiment, the start condition may be that a shape of at least one of the electrode rods becomes a predetermined shape or that a shape of at least one of the electrode rods is deformed to a predetermined degree from a last-time discharge test. Electrode rods 3b wear out with each repeated discharge, and the shapes of the electrode rods gradually change. As the shapes of electrode rods 3b change, an optimum fusion splicing condition gradually changes. However, if a discharge test is performed for each discharge, a frequency of the discharge test increases, resulting in a decrease in an efficiency of the fusion splicing operation. Therefore, when the shape of at least one of electrode rods 3b becomes a predetermined specific shape or when at least one of electrode rods 3b is deformed to a predetermined degree from the last-time discharge test, it is desirable to adjust a fusion splicing condition by performing a discharge test. Accordingly, it is possible to suppress a decrease in splicing quality caused by a change in the shapes of electrode rods 3b while suppressing a decrease in work efficiency.

As in the start condition (E) of the present embodiment, the start condition may be that a change amount of either one or both of an air temperature and an air pressure exceeds a predetermined threshold condition from a last-time discharge test. When a location where fusion splicing device 10 is used changes, weather conditions such as an air temperature and an air pressure also change. As the weather conditions change, an optimum splicing condition also changes. Therefore, it is desirable to adjust a fusion splicing condition by performing a discharge test when the change amount of either one or both of the air temperature and the air pressure from the last-time discharge test exceeds a predetermined threshold condition. As a result, a decrease in splicing quality due to a change in weather conditions can be suppressed.

As in the start condition (F) of the present embodiment, the start condition may be that an estimated loss value exceeds a predetermined threshold condition. A larger estimated loss value means that a fusion splicing condition deviates from an optimum condition. Therefore, it is desirable to perform a discharge test to adjust the fusion splicing condition when the estimated loss value exceeds the predetermined threshold condition. As a result, a decrease in splicing quality can be suppressed.

As in the start condition (G) of the present embodiment, the start condition may be occurrence of defective fusion splicing of the optical fibers. An occurrence of defective fusion splicing means that a fusion splicing condition deviates from an optimum condition. Therefore, it is desirable to adjust the fusion splicing condition by performing a discharge test when the defective fusion splicing occurs. As a result, it is possible to suppress continuous occurrences of defective fusion splicing.

As in the present embodiment, fusion splicing control unit 12 may keep causing the notification unit (either one or both of monitor 5 and speaker 11) to notify the information for prompting execution of a discharge test until the discharge test is executed. As a result, a user can be strongly prompted to execute the discharge test.

As in the present embodiment, fusion splicing control unit 12 may refuse a usual fusion splicing operation until the discharge test is completed. As a result, a user can be forced to execute the discharge test, so that it is possible to avoid a decrease in splicing quality due to non-execution of the discharge test.

The fusion splicing device and the operation method of the fusion splicing device according to the present disclosure are not limited to the embodiments described above, and various other modifications are possible. For example, the start conditions of the discharge test are not limited to (A) to (G) described above, and various other conditions can be applied. Not all of the above-described start conditions (A) to (G) are necessarily applied, and at least one of the start conditions (A) to (G) may be applied. Although the above embodiments exemplify a fusion splicing device that fusion-splices single-fibers, it may also be a fusion splicing device that fusion-splices multi-fibers. The above embodiments exemplify monitor 5 and speaker 11 as examples of the notification unit, but the notification unit of the present disclosure is not limited thereto.

REFERENCE SIGNS LIST 2 housing
3 fusion splicing unit
3a fiber positioning unit
3b electrode rod
3c optical fiber holder
4 heater
5 monitor
6 protection cover
7 power switch
8 splicing start switch
9 camera 10 fusion splicing device
11 speaker
12 fusion splicing control unit
13 basic control unit
14 execution unit
15 determination unit
D image data
F optical fiber
Fa fusion spliced portion

The invention claimed is:

1. A fusion splicing device comprising:
a fusion splicing unit configured to fusion-splice optical fibers by discharge between a pair of electrode rods;
a fusion splicing control unit configured to control an operation of the fusion splicing unit and having an operation mode for performing a discharge test;
an imaging unit configured to generate image data of a fusion spliced portion of the optical fibers; and
a notification unit configured to notify various types of information,
wherein the discharge test is to fusion-splice the optical fibers, to check a fusion-spliced state of the optical fibers on a basis of the image data, and to adjust a fusion splicing condition to be close to an optimum condition, and
wherein the fusion splicing control unit causes the notification unit to notify information for requesting execution of the discharge test when a predetermined start condition is satisfied.

2. The fusion splicing device according to claim 1, wherein the start condition is first starting of the fusion splicing control unit after shipment of the fusion splicing device.

3. The fusion splicing device according to claim 1, wherein the start condition is completion of replacement of at least one of the electrode rods.

4. The fusion splicing device according to claim 1, wherein the start condition is completion of a running-in discharge after replacement of at least one of the electrode rods.

5. The fusion splicing device according to claim 1, wherein the start condition is that a shape of at least one of the electrode rods becomes a predetermined shape.

6. The fusion splicing device according to claim 1, wherein the start condition is that a shape of at least one of the electrode rods is deformed to a predetermined degree from a last-time discharge test.

7. The fusion splicing device according to claim 1, wherein the start condition is that a change amount of either one or both of an air temperature and an air pressure exceeds a predetermined threshold condition from a last-time discharge test.

8. The fusion splicing device according to claim 1, wherein the start condition is that an estimated loss value exceeds a predetermined threshold condition.

9. The fusion splicing device according to claim 1, wherein the start condition is occurrence of defective fusion splicing of the optical fibers.

10. The fusion splicing device according to claim 1, wherein the fusion splicing control unit keeps causing the notification unit to notify the information for requesting execution of the discharge test until the discharge test is executed.

11. The fusion splicing device according to claim 10, wherein the fusion splicing control unit refuses a usual fusion splicing operation until the discharge test is completed.

12. The fusion splicing device according to claim 1, wherein the notification unit includes a monitor.

13. The fusion splicing device according to claim 1, wherein the notification unit includes a speaker.

14. An operation method of a device that fusion-splices optical fibers by discharge between a pair of electrode rods, the method comprising:
causing a notification unit that notifies various types of information to notify information for requesting execution of a discharge test when a predetermined start condition is satisfied,
wherein, in the discharge test, the optical fibers are fusion-spliced, a fusion spliced state of the optical fibers is checked on a basis of image data of a fusion-spliced portion of the optical fibers, and a fusion splicing condition is adjusted to be close to an optimum condition.

* * * * *